June 21, 1949.

A. G. FORSYTH 2,474,144

ELECTRICALLY AND POWER OPERATED
PITCH CHANGING MECHANISM

Filed Dec. 13, 1944

Inventor
ARCHIBALD GRAHAM FORSYTH,

By Robert B Larson
Attorney

June 21, 1949.  A. G. FORSYTH  2,474,144
ELECTRICALLY AND POWER OPERATED
PITCH CHANGING MECHANISM
Filed Dec. 13, 1944  5 Sheets-Sheet 3

Inventor
ARCHIBALD GRAHAM FORSYTH,
By Robert B. Pearson
Attorney

Patented June 21, 1949

2,474,144

UNITED STATES PATENT OFFICE 2,474,144

ELECTRICALLY AND POWER OPERATED PITCH CHANGING MECHANISM

Archibald Graham Forsyth, Cheam, England, assignor to The Fairey Aviation Company Limited, Hayes, Middlesex, England Application December 13, 1944, Serial No. 567,991

14 Claims. (Cl. 170—160.18)

This invention relates to devices for effecting changes in pitch of aircraft propellers and the like.

In my copending application Serial No. 498,367, filed August 12, 1943, now abandoned, I have illustrated and described means for changing the pitch of the propeller blades in the directions of coarse and fine pitch, to a reverse pitch position, and to feathering pitch. In one of the embodiments of such application, the pitch changing mechanism is actuated in the directions of fine and coarse pitch by a reversible electric motor, and the pitch changes to a reverse pitch position and to feathering pitch are effected by means powered from the propeller shaft and including power operated clutch mechanisms. It is an important feature of that invention that all of the mechanisms are embodied in a self-contained unit which surrounds the propeller shaft and is disposed between propeller hub and the front facing of the engine. The present invention relates to a similar arrangement and in fact comprises an improvement. The present application is a continuation-in-part of such prior application.

It is an object of the present invention to provide such an arrangement in which the electric motor is built into the housing of the unit with its drive connected at all times and in which, when pitch changes to reverse and feathering are desired, the electric motor will assist the power operated clutch mechanisms. In this manner the pitch change to reverse or feathering is accomplished at a rapid rate of speed and in such manner as to avoid clutch slippage.

In accordance with the invention, the pitch changes in the directions of coarse and fine pitch may be effected by the electric motor at, say, 8° per second, while pitch changes to reverse and feathering may be effected by the power operated clutches and the electric motor at, say 40° per second. It is an object of the invention to provide an arrangement which will so function.

To obviate "over-revving" and "under-revving" caused by a sudden abnormal throttle increase or decrease, the invention employs an auxiliary governor which will control the voltage passing to the electric motor. When "over-revving" or "under-revving" occurs, the auxiliary governor operates to supply the motor with greater amount of current so that pitch changes in the directions of coarse or fine path are quivkly effected at, say 16° per second. Thus, the speed of the engine is quickly restored to normal. The invention has an object the provision of such an arrangement.

A still further object of the invention is to provide such a pitch changing arrangement in which, should the main engine stop, the electric motor may be employed to change the pitch of the blades to feathering or reverse pitch.

In accordance with the invention an improved clutching mechanism is employed which is not dependent on centrifugal force for its operation and which will be capable of taking the whole of the drive for achieving reverse and feathering pitch at any main engine speed. It is another object of the invention to provide such a mechanism.

Another object of the invention resides in providing in a pitch changing unit an improved type of pitch limit switch mechanism which includes a series of switch tripping cams and in which the position of the reverse pitch limit switch may be adjusted.

These and other objects of the invention will become more apparent from the following description and claims when read in conjunction with the accompanying drawings, in which:

Figure 1:
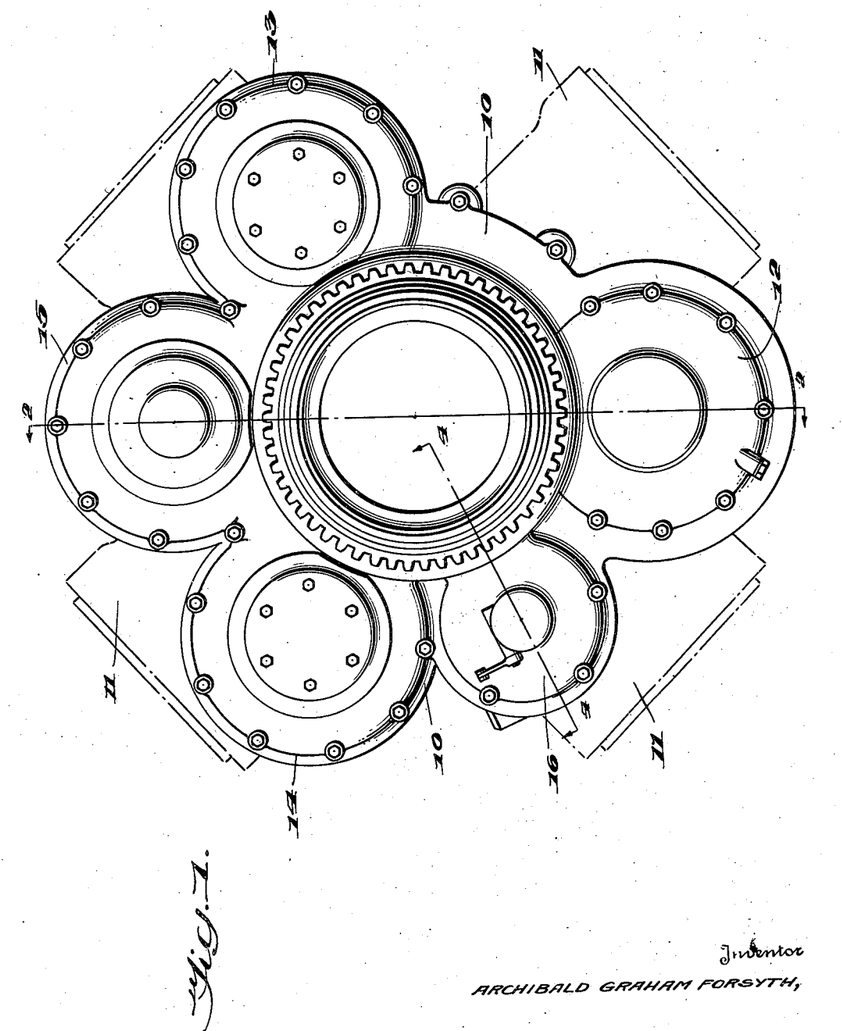
Fig. 1 is a rear elevation of a unit embodying the invention.
Figure 2:
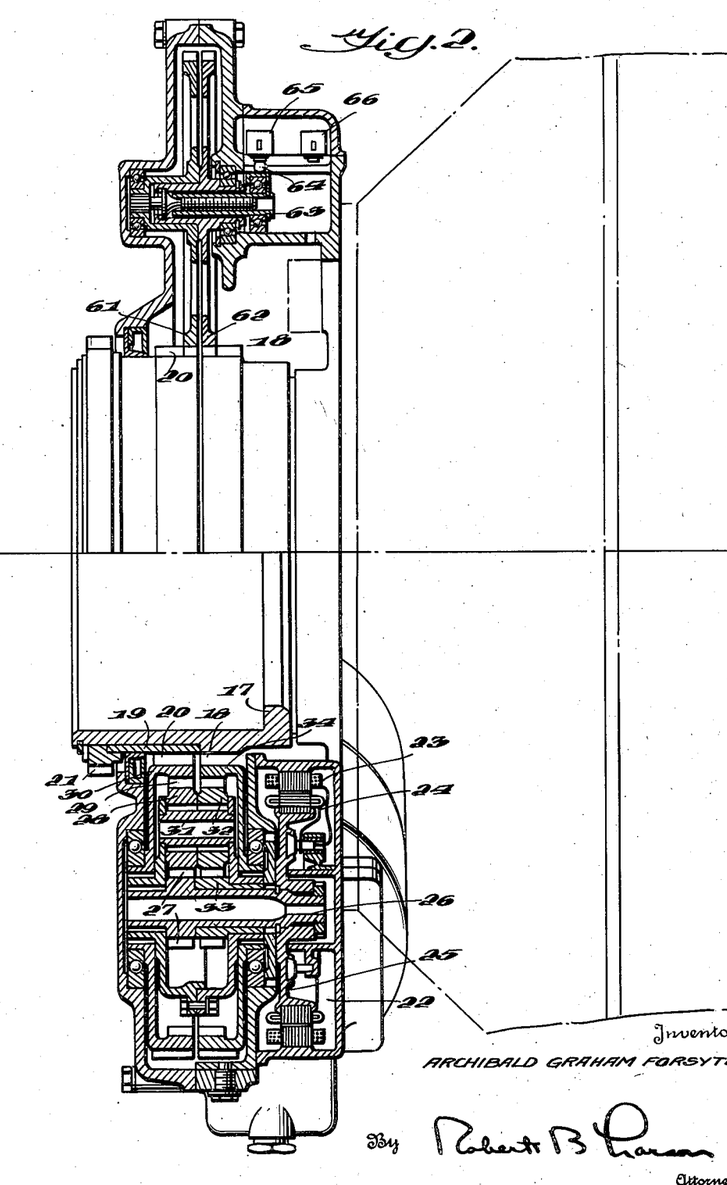
Fig. 2 is a section taken on the line 2—2 of Fig. 1.

The unit is illustrated in Figs. 1 and 2 as comprising a housing 10 of comparatively small thickness, which housing is adapted to surround the propeller drive shaft and is disposed between the front facing of the aircraft engine and the propeller hub, socket portions 11 which are shown in dot-and-dash lines in Fig. 1.

The housing encloses an electric motor driven pitch changing means 12 for actuating the pitch changing mechanism in the directions of fine and coarse pitch, and also two substantially identical clutching devices 13 and 14 in accordance with which pitch changes to reverse pitch and to feathering may be effected through power supplied from the propeller shaft. The reference numeral 15 represents mechanism (also enclosed in the housing) for actuating pitch limit switches when predetermined pitch limits have been reached.

The housing also encloses a governor 16 which is driven through the propeller shaft and which is operable to effect quick changes in the directions of coarse or fine pitch in response to abnormal throttle movements tending to cause quick changes in the speed of the engine. This mechanism, as will be explained, actuates the pitch changing mechanism in such manner as to bring the engine speed back to normal and thus to prevent the engine from "over-revving" or "under-revving."

With reference to Fig. 2, the reference numeral 17 indicates a sleeve adapted to be keyed to the propeller drive shaft (not shown) so as to rotate therewith.

The sleeve 17 is provided on its outer periphery with gear teeth 18. Disposed on the sleeve 17 so as to be rotatable with respect thereto is a second sleeve 19 provided on its outer periphery with two sets of gear teeth, namely the sets 20 and 21. The teeth of set 21 are adapted to engage with one or more pinions (not shown) connected with propeller blade pitch changing mechanism of a propeller disposed just forwardly of the unit. The teeth on sleeves 17 and 19 are on the same pitch circle, the outermost diameters of the sleeves being equal and the number of teeth on each is equal.

Pitch changing movement in the directions of coarse and fine pitch are effected by the mechanism 12. This mechanism (see Fig. 2) includes an electric motor 22 having an armature 23 and a rotor 24. The armature 23 is annular in form and is supported by the housing as shown in the drawing. The rotor 24 is supported by a wheel 25 which is keyed to a shaft 26. The outer periphery of the shaft 26 is provided with gear teeth 27, which mesh with teeth on a pinion 28 which in turn engages teeth 29 on the inner periphery of the member 30. The member 30 is provided with teeth on its outer periphery which engage the teeth 20 mounted on the sleeve 19. This sleeve 19 also carries the teeth 21 which actuate the pitch changing mechanism on the propeller hub.

The electric motor will have a speed range of from 1000 to 4000 R. P. M. Actuation of the electric motor 22 in one direction or the other, through the mechanism described, thus effects rotation of the sleeve 19 and through the gear teeth 21 changes the pitch of the propeller either in the direction of fine or coarse pitch.

The shaft 31 for the pinion 28 also supports a pinion 32 which engages teeth on a sleeve 33 and also teeth on the inner periphery of the member 34 similar to member 30. Member 34 is provided with teeth on its outer periphery which engage teeth 18 on the sleeve 17 driven by the propeller shaft.

It will be noted that the rotation of member 34 by the sleeve 17 will not effect pitch changing movement.

Figure 3:
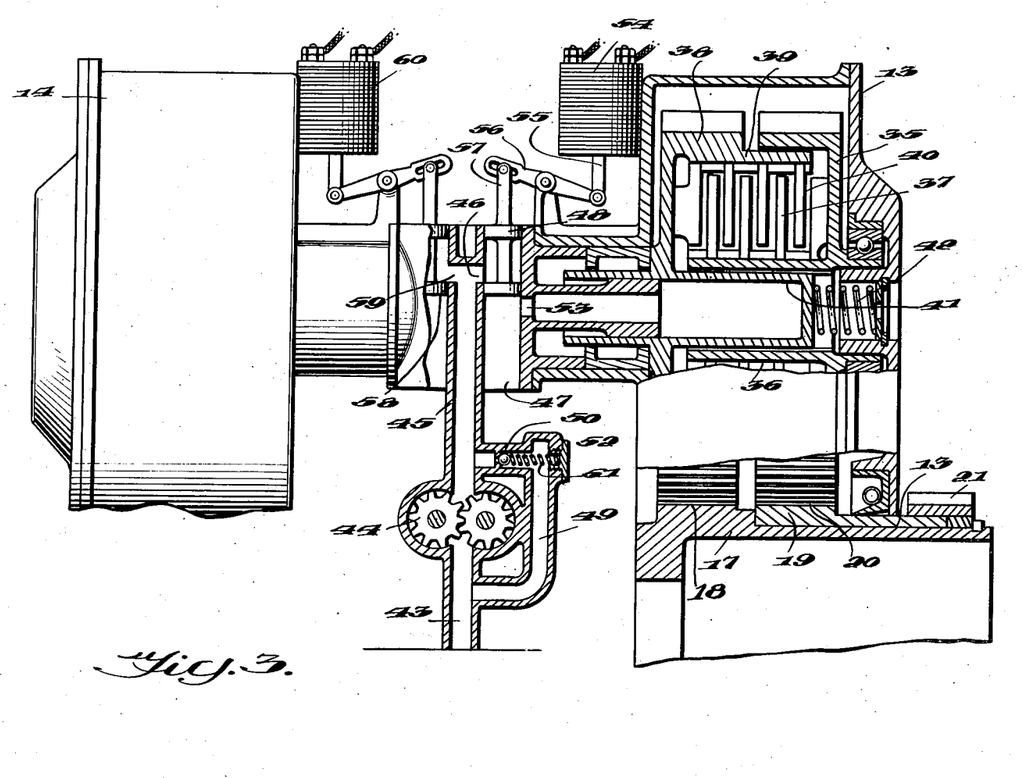
Fig. 3 is a schematic view of the clutch mechanisms for effecting reverse pitch and feathering.

The mechanisms 13 and 14 for effecting pitch changes to reverse and feathering are diagrammatically illustrated in Fig. 3. These devices include clutches, and the one employed in connection with the device 13 will now be described. The clutch comprises a clutch wheel 35 having gear teeth on its outer periphery engaging gear teeth 20 carried by the sleeve 19. The clutch wheel 35 has a laterally disposed sleeve 36 on which are secured a plurality of spaced annular clutch plates 37.

The mechanism 13 also includes a wheel 38 having gear teeth on its outer periphery adapted to engage the teeth 18 on the sleeve 17. The clutch wheel 38 has a laterally directed tubular portion 39 which has a plurality of spaced annular clutch plates 40 secured thereto. The clutch wheel 38 is also provided at its central axis with a laterally disposed cylindrical piston portion 41 which is positioned for sliding movement within the sleeve 36 of the clutch wheel 35, thus making possible relative sliding movements in an axial direction of the clutch wheels 35 and 38. When these clutch wheels are moved toward each other the clutch plates 37 and 40 engage, consequently clutching the clutch wheels 35 and 38 so that they move together.

The clutch wheels 35 and 38 are of the same diameter but they do not have the same number of teeth, the number of teeth on clutch wheel 35 being greater than the number of teeth on clutch wheel 38. It should be apparent that, since the sleeve 17 is driven by the propeller shaft, and when the clutch wheels 35 and 38 are clutched together, relative rotary movement will be effected between the sleeve 17 and the sleeve 19 because of the odd number of teeth on clutch wheels 35 and 38. Since sleeve 19 also carries the gear teeth 21 which engage the pitch changing mechanism of the propeller hub, a pitch change to reverse pitch position will be caused.

The piston-like portion 41 of the clutch wheel 38 is caused to move axially in a direction to effect declutching by the spring 42. Movement toward clutching position is effected, against the action of the spring 42, by means of a hydraulic system which will now be described.

Oil or other fluid from a source (not shown) is transferred by a pipe 43 to the pump 44 which pumps the fluid under pressure into the pipe 45. The pipe 45 has an outlet 46 communicating with a cylindrical passage 47 in which is disposed, for axial sliding movement, a valve piston 48. When the valve piston 48 is in the position shown in Fig. 3, the pressure of the fluid is built up in the pipe 45 and to prevent such pressure from exceeding a predetermined maximum a by-pass escape passage 49 is governed by a ball valve 50 which is controlled by the spring 51, the tension of which may be regulated by the screw cap 52.

If the valve piston 48 is lowered so as to effect communication between the outlet 46 and an inlet 53 which establishes communication with the inside of the piston 41, fluid under pressure will cause the piston 41 to move to the right in Fig. 3, thus effecting clutching of the clutch wheels 35 and 38.

Movement of the valve piston 48 in either an upward or a downward direction is effected by means of a solenoid 54, the movable arm 55 of which is connected through a pivoted double-armed lever 56 with the stem 57 extending upwardly from the valve piston 48 and preferably integral therewith.

The mechanism 14 is similar and operates in an identical way. The only difference between the mechanisms 13 and 14 is that the clutch wheels in mechanism 14, corresponding to the clutch wheels 35 and 38 in mechanism 13, while having odd numbers of teeth on their periphery, are reversed. The clutch wheel which corresponds to clutch wheel 38 has a lesser number of teeth thereon than the teeth on the clutch wheel which corresponds to clutch wheel 35, which is just the reverse in mechanism 13.

Similar to mechanism 13, the mechanism 14 includes a valve piston 58 to which fluid may pass through an opening 59 in pipe 45. The valve piston 58 is actuated upwardly or downwardly through similar linkage mechanism and by a similar solenoid 60.

The limits of pitch changing movement toward coarse and fine pitch positions and reverse and feathering positions are controlled through the device 15 (Figs. 1 and 2). Specifically, this device 15 is comprised of a pair of gear wheels 61 and 62, one of which, 61, engages the teeth 20 on the sleeve 19, while the other, 62, engages the teeth 18 on the sleeve 17. Normally the gear wheels 61 and 62 will operate at the same rate of speed. However, when pitch changing movement is effected such as by the electric motor which causes the sleeve 17 to rotate relatively with respect to the sleeve 19, the gear wheel 61 will, depending on the direction of such relative rotary movement, consequently rotate at either a greater or lesser rate of speed than gear wheel 62.

This relative movement between gear wheels 61 and 62 causes the member 63, through its threaded connection, to move axially. The member 63 carries contacts such as 64 which are adapted to trip the pitch limit switches, two of which are indicated by the reference numerals 65 and 66. It is understood that there are four of such limit switches, the other two not being shown since they are in a different plane. These four pitch limit switches, respectively, are for fine pitch, coarse pitch, reverse pitch and feathering pitch.

Figure 4:
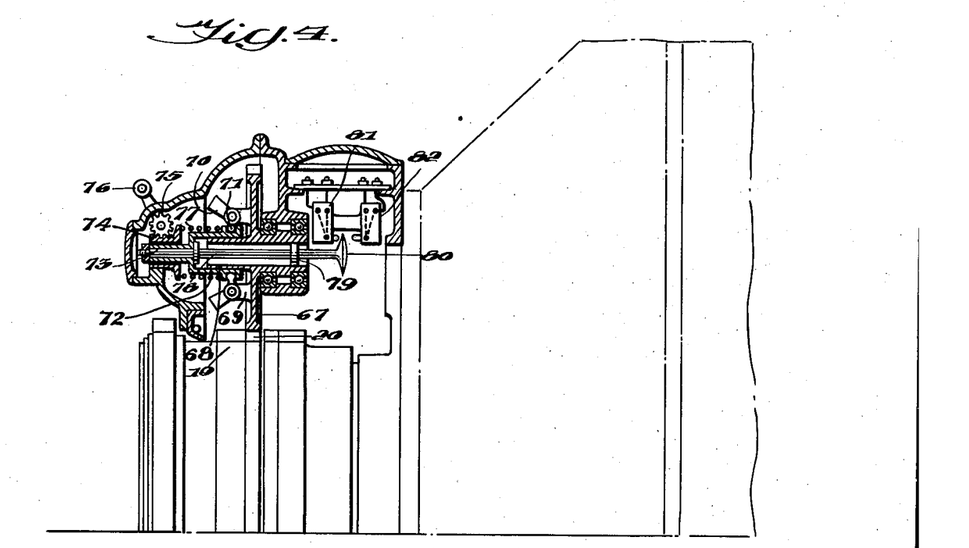
Fig. 4 is a section taken through the auxiliary governor on the line 4—4 of Fig. 1.

The auxiliary governor 16 is shown in section in Fig. 4. This governor includes a gear wheel 67 integral with a sleeve 68. The teeth on the outer periphery of the gear wheel 67 are adapted to engage with the teeth 20 on the sleeve 19.

Extending from one side of the gear wheel 67 are lugs 69 which carry double-armed levers, one arm of which is comprised of the governor weights 70, and the smaller arms 71 of which are engaged in an annular groove in a sleeve member 72. The sleeve member 72 has an end portion 73 of reduced diameter, which end portion is splined to a tubular rack member 74. The main portion of the sleeve member 72 surrounds the sleeve 68 of the gear wheel 67 and is mounted to slide axially with respect thereto. The rack member 74 is engaged by a pinion 75 which may be rotated by a lever 76. The rack member may thus be moved axially and in so doing adjusts the tension of the spring 77 disposed between the rack member and a portion of the sleeves 72. The tension of the spring, as will be clear to those skilled in the art, adjusts the governor.

The reduced end portion 73 of the sleeve 72 carries a rod 78 having a collar 79 which slidably engages within the sleeve 68 of the gear wheel 67. The rod 78 has, at its outer end, a member 80 which is disposed between two switches 81 and 82 so as to actuate either one.

It should be clear that a decrease in the rotational speed of the gear wheel 67 which is driven by teeth 20 on sleeve 19 will cause the weights 70 to move inwardly (because of the decrease in centrifugal force and because of the force of spring 77) and that the inner short arms 71 consequently move the sleeve 72 toward the right in Fig. 4. Such movement also causes the rod 78 to move to the right so that the portion 80 will engage the switch 82. An increase of speed in the engine will cause the weights 70 of the governor to move outwardly, thus moving the sleeve 72 to the left against action of the spring 77 and causing the portion 80 on rod 78 to actuate the switch 81.

The switches 81 and 82 are disposed in the governor circuit, as will be described, and control the amount of voltage passing to each side of the electric motor 23 (Fig. 2).

The operation of the unit can perhaps be best described in connection with the circuit diagram illustrated in Fig. 5. In this figure the reference numeral 83 indicates a twenty-four volt battery, the plus and minus lines of which normally run to the main governor 84. This main governor may be of any suitable type which is driven from the aircraft engine and which, upon increase of the engine speed, will close the coarse pitch switch 85, and which on a decrease of engine speed will close a fine pitch switch 86.

Upon closing of the coarse pitch switch 85 by the main governor, current will pass through the switch 81, thence through the resistance 87, through the coarse pitch limit switch 66 into one side of the reversible electric motor 23. The central minus post of the electric motor is connected by the line 88 to the minus side of the battery 83. The electric motor 23 thus energized will, in the manner described above, cause a pitch change in the direction of coarse pitch thus consequently reducing the speed of the engine.

Likewise, when the main governor closes the fine pitch switch 86, current will run through the switch 82 and the resistance 89 through the fine pitch limit switch 65 to the other side of the electric motor 23. Consequently, the electric motor will run in the opposite direction, and, through the mechanism described above, will effect a pitch change in the direction of fine pitch, thus increasing the speed of the aircraft engine.

The main governor 84 is designed to throw the fine pitch switch 86 and the coarse pitch switch 85 when predetermined limits of engine speeds are reached and this main governor is consequently employed during normal operation of the aircraft. Since actuation of the main governor results in energizing the reversible electric motor 23 through the resistances 87 and 89, approximately only 12 volts will be transmitted to the reversible motor during normal operation. The pitch changes in the directions of fine pitch and coarse pitch, in accordance with the mechanism described, will take place substantially at the rate of 8° per second.

The coarse pitch limit switch 66 and the fine pitch limit switch 65 are adapted to be tripped by the member 63 (Fig. 2) in the manner disclosed. In Fig. 5 the tripping means for these two switches has been indicated diagrammatically by cam-shaped members 90 and 91, respectively. When, for normal operation, the desired limit of movement in the coarse pitch direction or the desired limit of movement in the fine pitch direction has been reached these tripping members operate, respectively, the coarse pitch limit switch 66 or the fine pitch limit switch 65 to cut off the current to the electric motor and stop the pitch changing movement.

The purpose of the auxiliary governor, as mentioned previously, is to take care of conditions where the engine throttle is abnormally actuated to increase or decrease the engine speed rapidly. Such sudden thrust of the throttle in either direction will cause the engine to "over-rev" or "under-rev," and consequently the auxiliary governor will be actuated to operate either one of the two switches 81 or 82. Assuming that the engine throttle is quickly pushed forward so as to cause "over-revving" of the motor, the auxiliary governor 16 will actuate the switch 81, thus by-passing the resistance 87 and causing the battery to supply the electric motor 23 with twenty-four volts. This effects a quicker pitch change in the direction of coarse pitch and consequently returns the engine speed rapidly toward normal. The pitch change in the direction of coarse pitch under such conditions is effected at approximately 16° per second.

In a similar manner movement of the throttle quickly to a position causing a rapid decrease in engine speed will cause the auxiliary governor 16 to actuate switch 82. This by-passes the resistance 89 and sends the current from the battery direct to the other side of the reversible electric motor 23. The reversible motor thus operates on twenty-four volts effecting a pitch change in the direction of fine pitch at about 16° per second and consequently returns the engine speed to normal at a rapid rate.

Special branches of the circuit are provided for achieving a reverse pitch position and for achieving feathering pitch. As for reverse pitch, this is effected by moving the operating lever 92 so as to throw the reverse pitch switch 93. Current from the plus side of the battery 83 is carried to the reverse pitch solenoid 94 which effects clutching of the clutch wheels 35, 38 (Fig. 3) of the reverse pitch mechanism. The current passes through the solenoid 94, thence through the reverse pitch limit switch 95 and to one side of the reversible motor 23. It will be seen that under such conditions the auxiliary governor portion of the circuit is completely cut out, the main governor is temporarily overridden, and the full twenty-four volts of the battery are supplied both to the reverse pitch solenoid 94 and to the reversible motor 23. Consequently, very rapid movement of the pitch changing mechanism is effected in the direction of fine pitch through zero pitch to reverse pitch. The approximate rate of change to reverse pitch, under such conditions, is 40° per second. When the predetermined reverse pitch limit is reached the reverse pitch limit switch 95 will be tripped by the tripping member 96 to stop motor 23 and deenergize solenoid 94.

Figure 5:
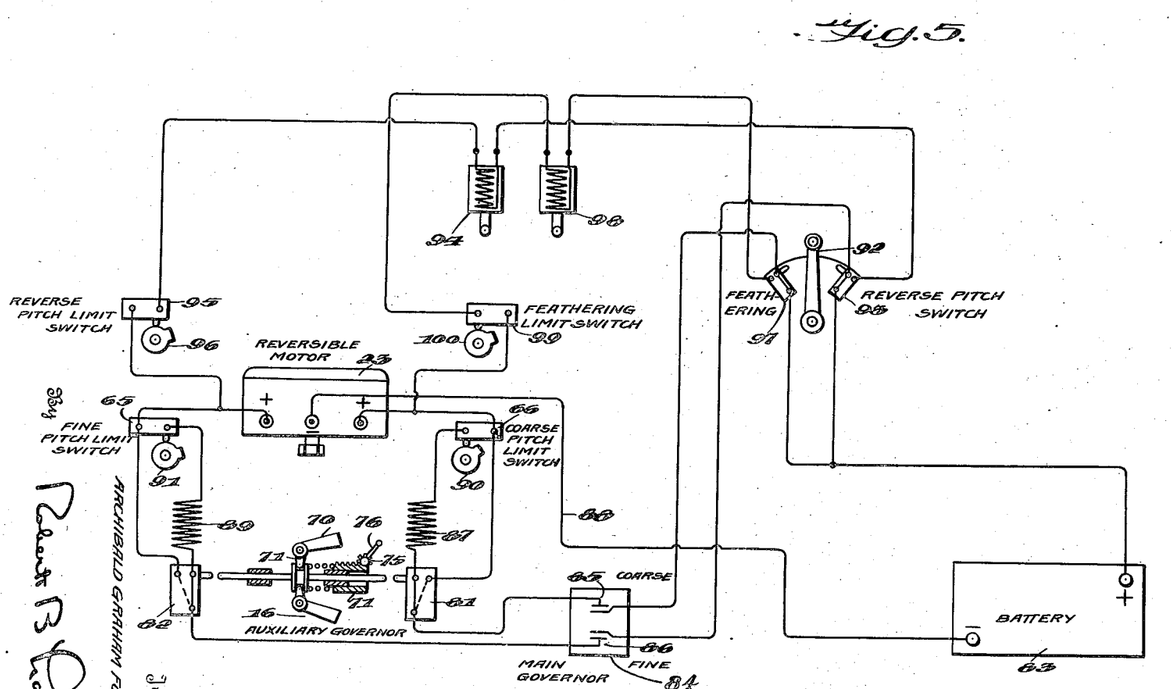
Fig. 5 is a diagram of an electric circuit which may be employed with the invention.

To effect feathering, the operating lever 92 is moved to the left in Fig. 5, thus throwing the feathering switch 97 and causing current from the plus side of the battery 83 to be carried direct to the feathering solenoid 98 which effects clutching of the clutch wheels of the feathering pitch mechanism. From the feathering solenoid 98 the circuit continues through the feathering limit switch 99 to the other side of the reversible motor 23. Consequently, here again, the full twenty-four volts of the battery are caused to energize this feathering solenoid 98 and the reversible motor, thus effecting a very rapid change (approximately 40° per second) in the direction of coarse pitch to feathering pitch. When the predetermined desired feathering pitch is reached, the feathering pitch limit switch 99 will be tripped by the tripping member 100, thus shutting off the current both to the electric motor and to the feathering solenoid 98.

It will be noted that when effecting both reverse pitch and feathering the electric motor remains in the circuit and starts the pitch changing mechanism off to reverse pitch or feathering as the case may be. The power operated clutches (Fig. 3) gradually pick up the drive and consequently the electric motor assists in putting the blades into reverse pitch or feathering, as the case may be. This has several advantages, one of which is that it eliminates the slip which would take place in power operated clutches not so assisted, such as illustrated in my copending application Serial No. 498,367, to which reference has been made.

Figure 6:
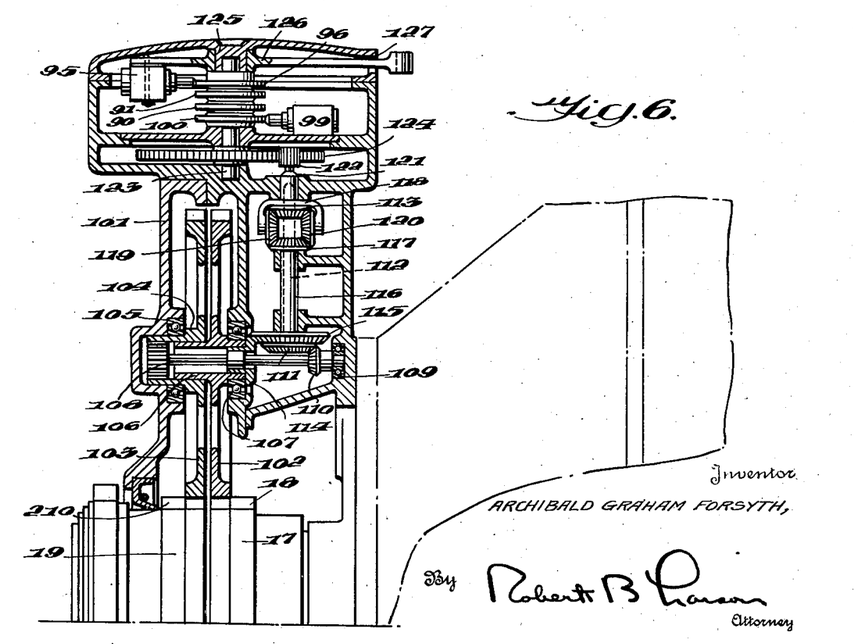
Fig. 6 is a section taken through a modified form of mechanism for actuating the pitch limit switches.

In Fig. 6 there is illustrated a modified form of mechanism for actuating the fine pitch, coarse pitch, feathering and reverse pitch limit switches. In accordance with this modification the housing includes a portion 101 which is disclosed in the same position as the mechanism 15 in Fig. 1. This housing has mounted therein two gear wheels 102 and 103 having gear teeth on their outer peripheries. The teeth on gear wheel 102 engage the gear teeth 18 on the sleeve 17 and the teeth on gear wheel 103 engage the gear teeth 20 on the sleeve 19. The number of gear teeth on gear wheel 102 are greater or less than those on the gear wheel 103.

The gear wheel 103 has a central sleeve portion 104 which is mounted for rotation in the housing by the bearings 105. The other gear wheel 102 has a central tubular portion 106 which is disposed for relative rotation within the sleeve 104. The gear wheel 102 is supported within the housing for rotation by the bearings 107.

A shaft 108 is keyed to the sleeve 104 of the gear wheel 103 and this shaft extends through the central tubular portion 106 of the gear wheel 102 and is supported for rotation in the housing at its other end by means of the bearings 109. It will be seen that rotation of the gear wheel 102 will cause rotation of the shaft 108.

This shaft carries a bevel gear 110 engaging with a bevel gear 111 on a vertical shaft 112, the upper end of which carries a bevel gear 113 which is secured rigidly thereto. The central tubular portion 106 of the gear wheel 102 is keyed to a bevel gear 114 which engages a bevel gear 115 secured to the base of a hollow tubular shaft 116, the upper end of which carries the bevel gear 117 which is rigid therewith.

The housing supports a bracket 118 which supports two bevel gears 119 and 120, both of which engage the bevel gears 113 and 117. This bracket has a stub shaft 121 mounted for rotation in the housing and the upper end of which carries a pinion 122.

Supported in the upper part of the housing is a shaft 123 on which is mounted a large gear wheel 124 which is engaged by the pinion 122, and a series of switch tripping members in the form of cams. These tripping members, or cams, are the same as those shown in Fig. 5 where they are indicated by the reference numerals 90, 91, 96, 100. In Fig. 6 only two of the pitch limit switches are shown. These are the feathering pitch limit switch 99 and the reverse pitch limit switch 95. The coarse pitch limit switch 66 and fine pitch limit switch 65 (Fig. 5) do not show in Fig. 6 since they are in different planes from the feathering and reverse pitch limit switches.

The operation of this modification is as follows. When a pitch change is effected, in the manner heretofore described, the sleeve 17 will rotate relatively with respect to the sleeve 19. This will cause relative rotation between the gear wheels 102 and 103 and the gear wheel 103, through the shaft 108, bevel gears 110, 111, shaft 112 and bevel gear 113 will effect rotation of the bracket 118 (through bevel gears 119 and 120) and consequently of the pinion 122. This will be so since the bevel gear 117 rotated by the hollow shaft 116, bevel gear 115 and bevel gear 114 turning with the other gear wheel 102, rotate at a different rate of speed. Actuation of pinion 122, through gear 124, rotates the shaft 123 and causes rotary movement of the cams 100, 90, 91 and 96 secured thereto. When no pitch change is being effected the gear wheels 102 and 103 will rotate at the same rate of speed and this will effect rotation of the two bevel gears 113 and 117 at the same rate of speed so that no turning movement of the bracket 118 will result. Consequently, there will be no rotary movement transmitted to the cams.

In accordance with this modification it is possible to adjust the position of the reverse pitch limit switch 95. This is of advantage since before going into a dive or when coming in to land the pilot may set the reverse pitch limit switch to stop the pitch change at the particular predetermined reverse pitch limit required for the given conditions. The manner of adjusting the position of the reverse pitch limit switch is as follows. The upper part of the housing contains a downwardly projected stud 125 on which is mounted for rotation a double-armed lever 126. The short arm of this double-armed lever 126 supports the reverse pitch limit switch 95 and the long arm of the double armed lever extends through a slot 127 in the casing and terminates in a boss which may be connected by any suitable means to an actuating mechanism. By moving the long arm of the double-armed lever the lever will pivot about the stud 125 and the position of the reverse pitch limit switch 95 can thus be adjusted.

The structure illustrated and described is capable of change without departing from the invention which is not to be limited except as indicated in the following claims.

What I claim is:

1. A control unit for variable pitch propeller systems comprising a reversible electric motor for effecting pitch changes in the directions of fine and coarse pitch, means driven by the propeller drive shaft for effecting pitch changes to a reverse pitch position and to feathering pitch, an electric circuit powered by a source of direct current, means in said circuit for energizing the electric motor with substantially less than the full voltage of said source for effecting changes in the directions of fine and coarse pitch, and means in said circuit for energizing the motor with the full voltage of said source of direct current and for simultaneously effecting actuation of said means driven by the propeller drive shaft for effecting changes to a reverse pitch position and to feathering pitch.

2. A control unit for variable pitch propeller systems comprising a reversible electric motor for effecting pitch changes in the directions of fine and coarse pitch, means driven by the propeller drive shaft for effecting pitch changes to a reverse pitch position and to feathering pitch, an electric circuit powered by a source of direct current, means in said circuit for energizing the electric motor with substantially less than the full voltage of said source of direct current for changes in the directions of fine and coarse pitch, and means in said circuit for energizing the motor with the full voltage of said source of direct current and for simultaneously effecting actuation of said means driven by the propeller drive shaft for effecting changes to a reverse pitch position and to feathering pitch, and means operable upon a pitch changing movement for shutting off the current to said motor and to said means for effecting actuation of said propeller shaft driven means when predetermined limits of fine, coarse, reverse and feathering pitch have been attained.

3. A variable pitch propeller system for aircraft and the like comprising, pitch changing mechanism, electric motor means connected to actuate said mechanism to effect changes in the directions of fine and coarse pitch, means driven by the propeller shaft for effecting changes to a reverse pitch position and to feathering pitch, electrical devices for actuating said propeller shaft driven means, an electric circuit including a battery, selective means for energizing said electric motor with substantially less than the full amount of the power available from said battery to effect pitch changes in the directions of fine or coarse pitch at a relatively low rate of change, and selective means for energizing said electric motor and said electrical devices with a greater amount of the power of said battery to cause both said electric motor and said propeller shaft driven means to effect a change in pitch to a reverse pitch position or to feathering pitch at a relatively high rate of change.

4. A system as defined in claim 3, said electrical devices comprising solenoids.

5. A variable pitch propeller system for aircraft and the like comprising, pitch changing mechanism, a reversible electric motor connected to actuate said mechanism to effect changes in the directions of fine and coarse pitch, said motor having electrical connections for operating the motor in two directions, means driven by the propeller shaft for effecting changes to a reverse pitch position and to feathering pitch, electrical devices for actuating said propeller shaft driven means, a governor actuated by aircraft engine speed, an electric circuit having a source of electric power, said electrical devices and said electrical motor being connected in said circuit, resistances in said circuit and connectable to said electric motor electrical connections, and switch means actuated by said governor to cause the current to by-pass said resistances thus energizing the electric motor with the full voltage of said electric power source to effect a rapid change of pitch in the directions of coarse or fine pitch when the speed of the governor is rapidly increased or decreased.

6. A variable pitch propeller system for aircraft and the like comprising, pitch changing mechanism, electric motor means connected to actuate said mechanism to effect changes in the directions of fine and coarse pitch, means driven by the propeller shaft for effecting changes to a reverse pitch position and to feathering pitch, electrical devices for actuating said propeller shaft driven means, an electric circuit including a battery, selective means for energizing said electric motor with substantially less than the full amount of power available from said battery to effect pitch changes in the directions of fine or coarse pitch at a relatively low rate of change, and selective means for energizing said electric motor and said electrical devices with a greater amount of the battery power to cause both said electric motor and said propeller shaft driven means to effect a change in pitch to a reverse pitch position or to feathering pitch at a relatively high rate of change, said propeller shaft driven means each including a pair of clutch wheels carrying clutch plates and mounted for relative movement in an axial direction, piston means connected to one of said wheels and adapted to be moved by fluid under pressure, fluid lines connected to said piston means, a valve in each fluid line, and means connecting each of said electrical devices to actuate one of said valves.

7. A control unit for variable pitch propeller systems, said control unit comprising a sleeve mounted for rotation with the propeller drive shaft, a second sleeve carried by said first sleeve for relative rotation with respect to said first sleeve, said sleeves having the same outer diameter and each provided with an equal number of gear teeth, said second sleeve being adapted for connection to pitch changing mechanism, a pair of coaxial gear wheels of the same size, one of which engages said first sleeve and the other of which engages said second sleeve, said gear wheels having different numbers of teeth, means for selectively coupling said gear wheels to rotate as a unit, whereby relative movement will be effected between said sleeves and pitch changing movement will be effected, an electric motor connected to rotate said second sleeve, a solenoid for effecting coupling of said gear wheels, an electric circuit including a battery, said electric motor and said solenoid, resistance means in said circuit interposed in the electrical connector through which current is passed to energize said electric motor, switch means in the circuit for energizing the electric motor alone and through said resistance means to effect pitch changing movement at a relatively low rate of speed, and switch means for by-passing said resistance means for energizing said solenoid and said electric motor with the full power of the battery to effect pitch changing movement at a relative high rate of speed.

8. A control unit for variable pitch propeller systems, said control unit comprising a sleeve mounted for rotation with the propeller drive shaft, a second sleeve carried by said first sleeve for relative rotation with respect to said first sleeve, said sleeves having the same outer diameter and each provided with an equal number of gear teeth, said second sleeve being adapted for connection to pitch changing mechanism, a pair of coaxial gear wheels of the same size, one of which engages said first sleeve and the other of which engages said second sleeve, said gear wheels having different numbers of teeth, means for selectively coupling said gear wheels to rotate as a unit, whereby relative movement will be effected between said sleeves and pitch changing movement will be effected, an electric motor connected to rotate said second sleeve, a solenoid for effecting coupling of said gear wheels, an electric circuit including a battery, said electric motor and said solenoid, resistance means in said circuit interposed in the electrical connector through which current is passed to energize said electric motor, switch means in the circuit for energizing the electric motor alone and through said resistance means to effect pitch changing movement at a relatively low rate of speed, switch means for by-passing said resistance means for energizing said solenoid and said electric motor with the full power of the battery to effect pitch changing movement at a relative high rate of speed, and means operable upon relative movement of said sleeves for effecting uncoupling of said gear wheels and deenergization of said electric motor when predetermined pitch positions have been attained.

9. A control unit for variable pitch propeller systems comprising a reversible electric motor for effecting pitch changes in the directions of fine and coarse pitch, means driven by the propeller drive shaft for effecting pitch changes to a reverse pitch position and to feathering pitch, an electric circuit powered by a source of direct current, means in said electric circuit for energizing said electric motor with substantially less than the full voltage of said source for effecting changes in the directions of fine and coarse pitch, means in said circuit for energising said motor with the full voltage of the source and for simultaneously effecting actuation of said means driven by the propeller drive shaft for changes effecting to a reverse pitch position and to feathering pitch, means operable by pitch changing movement for shutting off the current to said motor and to said means for effecting actuation of said propeller shaft driven means when predetermined limits of fine, coarse, reverse and feathering pitch have been attained, and means within the unit for adjusting during flight the limit of reverse pitch.

10. A control arrangement for variable pitch propellers the hubs of which carry pitch changing mechanism, a sleeve surrounding the propeller drive shaft and driven thereby, a second sleeve mounted for relative rotation with respect to said first sleeve, both of said sleeves having gear teeth on their outer peripheries, said second sleeve being adapted for operative connection with the pitch changing mechanism, a reversible electric motor for rotating said second sleeve relatively to the first sleeve in one direction or the other to effect pitch changing movement toward fine or coarse pitch, said motor having separate electrical connections for operating the motor in said two directions, a pair of clutch mechanisms, one for effecting pitch changes to a reverse pitch position and the other to feathering pitch, each of said clutch mechanisms having two clutch wheels having different numbers of gear teeth on their peripheries, the teeth of one wheel engaging teeth on the first sleeve and the teeth of the other clutch wheel engaging the teeth on the second sleeve, whereby clutching of the clutch wheels together will cause the first sleeve to drive the second sleeve, a solenoid for each of said clutches, an electric circuit including an electric battery, said solenoids, said electric motor and resistances connectable to each of said motor connections, switch means for energizing said electric motor through one or the other of said resistances to effect pitch changes in the directions of fine or coarse pitch at a relatively low rate of change, and switch means operable to energize one or the other of said solenoids and to shunt the resistances to energize said solenoids and said electric motor with the full power of said battery to effect pitch changes a reverse pitch position or to feathering pitch at a relatively high rate of change.

11. A control unit for variable pitch propellers comprising a housing positioned between the propeller hub and the aircraft engine and surrounding the propeller drive shaft, a sleeve within the housing connected to be rotated by the propeller shaft, a second sleeve mounted for rotation relative to said first sleeve, each of said sleeves having gear teeth on their outer peripheries, said second sleeve having means for connection with pitch changing mechanism to actuate the same, a reversible electric motor mounted within said housing, said motor having separate electrical connections for operating the motor in two directions, gearing connecting said motor with said second sleeve to rotate the latter upon energization of the motor to actuate said pitch changing mechanism in the directions of fine or coarse pitch, a pair of clutches within said housing, each pair having two clutch wheels provided with different numbers of gear teeth and engaging respectively the teeth on said sleeves, means for clutching said wheels to rotate together, whereby relative rotation between said sleeves will be effected, one of said clutches effecting a pitch change to a reverse pitch position and the other to feathering pitch, a solenoid for actuating each of said clutches, an electric circuit including an electric battery, said solenoids, said electric motor and resistances connectable to said motor connections, a switch means for energizing said electric motor through one or the other of said resistances to effect pitch changes in the directions of fine or coarse pitch at a relative low rate of change, and switch means operable to energize one or the other of said solenoids and to shunt the resistances to energize said solenoids and said electric motor with the full power of the battery to effect pitch changes to a reverse pitch position or to feathering pitch at a relatively high rate of change.

12. A control arrangement for variable pitch propellers the hubs of which carry pitch changing mechanism, a sleeve surrounding the propeller drive shaft and driven thereby, a second sleeve mounted for relative rotation with respect to said first sleeve, both of said sleeves having gear teeth on their outer peripheries, said second sleeve being adapted for operative connection with the pitch changing mechanism, a reversible electric motor for rotating said second sleeve relatively to the first sleeve in one direction or the other to effect pitch changing movement in the directions of fine or coarse pitch, said motor having separate electrical connections for operating the motor in said directions, clutching mechanism for operatively connecting the first sleeve to the second sleeve to drive said second sleeve in one direction to effect a pitch change to a reverse pitch position, clutching mechanism for operatively connecting the first sleeve to the second sleeve to drive the second sleeve in the other direction to effect a pitch change to feathering pitch, a solenoid for each of said clutching mechanisms, an electric circuit including an electric battery, said solenoids, said electric motor and resistances connectable to said motor connections, switch means for energizing said electric motor through one or the other of said resistances to effect pitch changes in the directions of fine or coarse pitch at a relatively low rate of change, and switch means operable to energize one or the other of said solenoids and to shunt the resistances to energize said solenoids and said electric motor with the full power of said battery to effect pitch changes to a reverse pitch position or to feathering pitch at a relatively high rate of change.

13. A variable pitch propeller system for aircraft and the like comprising, pitch changing mechanism, a reversible electric motor connected to actuate said pitch changing mechanism to effect pitch changes in the directions of fine or coarse pitch, said motor having separate electrical connections for operating the motor in two directions, mechanism for driving the pitch changing mechanism in one direction from the propeller shaft to effect pitch change to a reverse pitch position, mechanism for driving the pitch changing mechanism in the other direction from the propeller to effect a pitch change to feathering pitch, electrical means for actuating each of said reverse pitch and feathering pitch mechanisms, an electric circuit including a battery, said electrical means and resistances connectable to said electric motor connections, switch means for energizing said electric motor through one or the other of said resistances to effect pitch changes in the directions of fine or coarse pitch at a relatively low rate of change, and switch means for energizing one or the other of said electrical means and operable to shunt the resistances to energize said electric motor with the full power of said battery to effect pitch changes to a reverse pitch position and to feathering pitch by driving said pitch changing mechanism both through said electric motor and said reverse pitch and feathering pitch mechanisms and at a relatively high rate of pitch change.

14. A control unit for variable pitch propeller systems comprising a reversible electric motor for effecting pitch changes in the directions of fine and coarse pitch, an electric circuit powered by a source of direct current for energizing said electric motor, means driven by the propeller drive shaft for effecting pitch changes to a reverse pitch position and to feathering pitch, a main governor driven by the aircraft engine, switches in said circuit controlled by said main governor to direct substantially less than the full voltage of said source to said electric motor to effect pitch changes in the directions of fine and coarse pitch to control the engine speed within predetermined limits during normal flight conditions, an auxiliary governor driven by the engine, switches in said circuit operable by said auxiliary governor in response to abnormally abrupt engine speed changes to direct the full voltage of said source to said electric motor to effect rapid pitch changes in the directions of fine and coarse pitch to restore the engine speed to normal predetermined limits of speed, and means in said circuit for energizing the motor with the full voltage of the source and for simultaneously effecting actuation of said means driven by said propeller shaft for effecting changes to a reverse pitch position and to feathering pitch, whereby rapid pitch changes to a reverse pitch position and to feathering pitch are accomplished by utilizing both said electric motor and said propeller shaft driven means.

ARCHIBALD GRAHAM FORSYTH.

REFERENCES CITED

The following references are of record in the file of this patent:

UNITED STATES PATENTS

| Number | Name | Date |
|---|---|---|
| 2,181,985 | Waseige | Dec. 5, 1939 |
| 2,293,912 | Mullen | Aug. 25, 1942 |
| 2,314,025 | Waseige | Mar. 16, 1943 |
| 2,327,216 | Reiber | Aug. 17, 1943 |
| 2,327,217 | Reiber et al. | Aug. 17, 1943 |
| 2,346,007 | Chillson | Apr. 4, 1944 |
| 2,346,856 | Martin | Apr. 18, 1944 |
| 2,376,673 | Duchaussoy | May 22, 1945 |
| 2,378,938 | McCoy | June 26, 1945 |
| 2,405,488 | Briner | Aug. 6, 1946 |